Aug. 4, 1964  G. ULSH  3,142,931
COMBINATION FISH HOOK HOLDER AND CONTAINER THEREFOR
Filed July 5, 1962
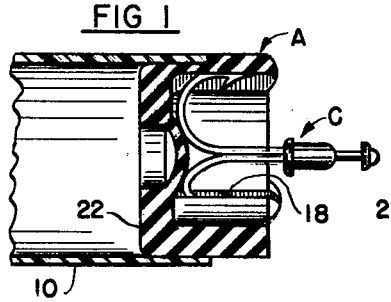
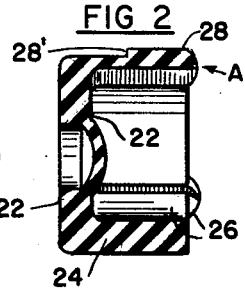
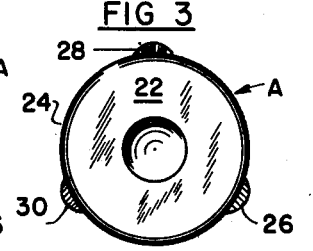
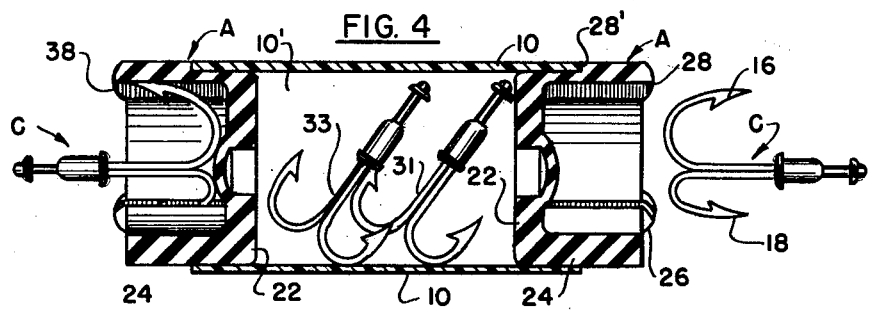
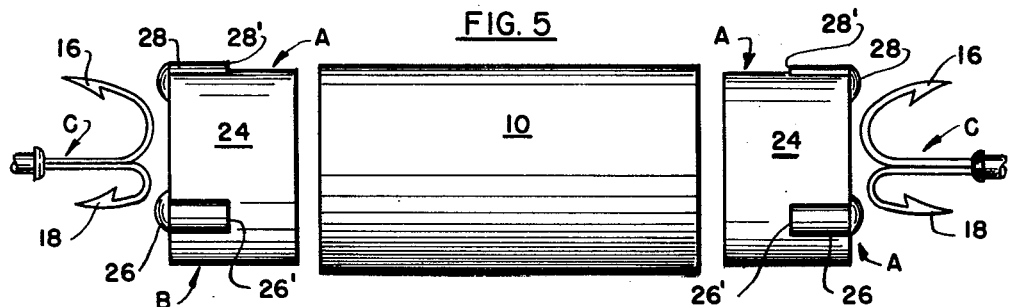
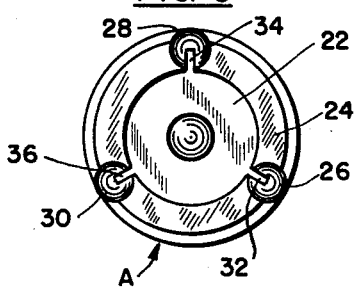
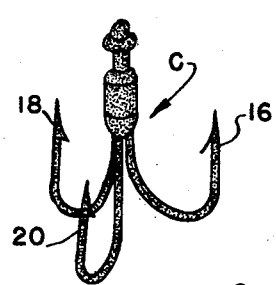
INVENTOR
GEORGE ULSH
BY
ATTORNEY

United States Patent Office 3,142,931
Patented Aug. 4, 1964

3,142,931
COMBINATION FISH HOOK HOLDER AND
CONTAINER THEREFOR
George Ulsh, 7343 Windsor Mill Road, Baltimore, Md.
Filed July 5, 1962, Ser. No. 207,667
3 Claims. (Cl. 43—57.5)

The present invention relates to a combination container and fish hook holding device for holding the hooks when they are being attached to a fishing lure, particularly to the type of lure attachment shown in my prior application Serial No. 42,606, filed July 13, 1960, entitled "Releasable Fish Hook," and now Patent No. 3,091,885.

The primary object of the invention is to provide a container for carrying fish hooks without having them exposed to engagement with other equipment, or injury to the person handling them and for use as a holding element for inserting and releasing the hook shank into, or from a fishing lure, or other fishing tackle.

Another object of the invention is to provide such a device wherein a maximum number of hooks may be conveniently carried within a minimum sized container and in a manner in which they may be ready for immediate use.

While several objects of the invention have been set forth, other objects, uses and advantages will become apparent as the nature of the invention is more fully disclosed and the same consists of its novel construction, combination and arrangement of its several parts shown in the accompanying single sheet of drawings forming a part of this specification and in which:

FIGURE 1 is a fragmentary longitudinal sectional view of one end of the device including part of the fish hook container and one of the hook holding elements.

FIGURE 2 is a longitudinal sectional view of one of the hook holding elements.

FIGURE 3 is an elevational view of the inner end of the hook holding element shown in FIGURE 2.

FIGURE 4 is a sectional view of the device showing an elongated container element and hook holding elements frictionally engaging each end of the container element.

FIGURE 5 is an exploded view of the device showing the elongated body portion and the hook holding elements in their relative positions prior to assembling.

FIGURE 6 is a view in elevation of the outer end of the hook holding element.

FIGURE 7 is a perspective view of a cluster type fish hook assembly to be carried in the holding element.

In referring to the drawings like reference numerals are used to point out like and similar parts throughout the several views. While the device is shown having a hook holding element in each end of an elongated cylindrical body portion, the body portion may have a closed end and have only one end provided with the hook holding element.

The device comprises in general a combination container and a hook holding element. The container portion having an elongated and preferably, a transparent body portion 10, hook holding elements A which are preferably used as each end of the body portion 10, as is shown in FIGURE 4. As the hook holding elements are of identical construction, only one detailed description will be necessary to illustrate its novelty and the relationship between these hooks holding elements and the body portion.

The body portion 10 is preferably constructed of a semi-rigid transparent plastic material, but is not limited thereto. The hook holding elements are preferably constructed of a pliable rubber material which is much more pliable than the body portion 10 and are adapted to frictionally engage the ends of the body portion for a predetermined distance, thus leaving the center portion 10' of the body portion open to form a hollow container for the storage of fishing hooks.

The holding element is particularly designed for the accommodation of a cluster type hook assembly designated by the letter C, each of which have three or more barbed hooks, such is probably shown best at 16, 18 and 20 in FIGURE 7.

The holding element A is designated to be described in detail and is of general cup shaped form having an inner end portion 22, and a side portion 24. The side portion 24 is of such diameter as to frictionally engage the ends of the elongated body member 10, and act as a closure for the container portion 10. Extending about the circumference of the side portion 24 are riblike extensions 26, 28 and 30 running perpendicular to the top and bottom surfaces of the hook holding element. There is provided on the inner surface of the side portion 24 opposite the riblike members 26 to 30 grooves 32, 34 and 36. The grooves are so positioned and of such depth as to frictionally receive the hook elements of the hook cluster adjacent the barb of the hook, the points of the hook when the shank portion adjacent the hook elements is fully inserted within the hook holding element being below the outer surface of the holding element, as shown at 38 in FIGURE 4. As illustrated, these extensions extend only part way down the outer surface of the side wall as indicated at 26', 28' and 30' to provide a stop for limiting the engagement of the element A with the container element 10. This limited engagement with the member 10 allows the outer portion of the element A to extend beyond the ends of the body member 10 and will allow the element A to be expanded when the hook cluster is inserted therein. Also, the outer end of the element A may be readily compressed, or pinched by the user about the cluster to hold the same when being inserted or disengaged from the attaching means carried by the lure, or tackle, as the case may be. These riblike members 26 to 30 are further useful in providing a better grip on the hook holding element when attaching or removing them from the ends of the body member 10.

In FIGURE 4, the several parts of the device are shown in relative position for assembly including several extra fish hook clusters 31 and 33 within the body portion 10. Normally a hook cluster is secured within the holding members A at each end of the member 10 by inserting the hook elements of the cluster into and along the grooves 32 to 36 until the points of the hooks are well below the outer surface of the holders to prevent the hooks from coming in contact with other articles or from injuring the user. At this point the device including the hook is ready to be stored, or carried on the person of the user without inconvenience or danger from the hooks.

The advantages of using the device, is that, these fish hook clusters may be carried or stored with safety and convenience by the user. By deforming the outer end of the pliable holder A by pressure by the fingers, the hook may be tightly held therein while it is being inserted or removed from the bait or other fishing tackle.

While the invention has been illustrated and described in a specific form, it is not intended as a limitation and the scope of the invention is to be limited only by the language of the appended claims.

I claim:

1. A container for fish hooks comprising a hollow rigid elongated tubular body portion having at least one open end adapted to accommodate a plurality of separate individual fish hook clusters, a pliable combination closure for the tubular body and a hook cluster holding element adapted to releasably hold a single fish hook cluster provided with hook elements and a shank portion, said closure and hook holding element having a closed inner end, an open outer end and a substantially tubular side wall, means carried by the outer surface of the closure and hook holding element for allowing a part of the side wall thereof to become engaged with the tubular body portion whereby the open end of the closure and hook holding element extends outwardly from the end of the tubular body, the inner surface of the side wall of the closure and hook holding element having means for guiding the hook cluster axially of the closure and hook holding element and being of such diameter and depth as to slidably receive the cluster through the open end thereof to a point where the hook elements and shank portion adjacent the hook elements are totally within the side wall.

2. A container for fish hook clusters as claimed in claim 1 wherein, the means carried by the outer surface of said closure and hook holding element for allowing a part of the side wall to become engaged with the tubular body portion being so positioned on the outer side wall surface thereof as to allow substantially one-half of the closure and hook holding element to become engaged with the tubular body portion.

3. A container for fish hook clusters as claimed in claim 1 wherein each end of the tubular body portion is provided with the combined closure and hook holding element.

References Cited in the file of this patent

UNITED STATES PATENTS

| | | |
|---|---|---|
| 424,539 | Cole | Apr. 1, 1890 |
| 2,204,185 | Loughheed | June 11, 1940 |
| 2,693,662 | Norton et al. | Nov. 9, 1954 |